United States Patent [19]

Ringwall

[11] 3,961,536
[45] June 8, 1976

[54] FLUIDIC ACCELEROMETER
[75] Inventor: Carl Gustave Ringwall, Scotia, N.Y.
[73] Assignee: General Electric Company, New York, N.Y.
[22] Filed: Nov. 15, 1974
[21] Appl. No.: 524,195

[52] U.S. Cl. .............................................. 73/515
[51] Int. Cl.² ...................................... G01P 15/02
[58] Field of Search ............. 73/514, 515, 516 R, 73/517 B

[56] References Cited
UNITED STATES PATENTS

| | | | |
|---|---|---|---|
| 2,945,378 | 7/1960 | Martin | 73/516 R X |
| 3,010,324 | 11/1961 | Pitzer et al. | 73/516 R X |
| 3,469,456 | 9/1969 | Riordan et al. | 73/515 |
| 3,501,946 | 3/1970 | Riordan et al. | 73/515 |
| 3,509,774 | 5/1970 | Evans | 73/515 |
| 3,675,473 | 7/1972 | Kantola et al. | 73/515 X |

*Primary Examiner*—James J. Gill
*Attorney, Agent, or Firm*—Stephen A. Young; Walter C. Bernkopf; Robert A. Cahill

[57] ABSTRACT

A fluidic accelerometer having a single sensitive axis. The accelerometer is comprised of a seismic mass having first and second end surfaces positioned perpendicular to the sensitive axis, viscous damping means for suspending the seismic mass in a normal null position and for damping oscillatory movement of the seismic mass in the direction of the sensitive axis, and means responsive to movement of the seismic mass in the direction of the sensitive axis for providing a restoring force to return the seismic mass to the normal null position and for producing an output fluidic signal variation proportional to the acceleration of the seismic mass in the direction of the sensitive axis.

9 Claims, 1 Drawing Figure

FLUIDIC ACCELEROMETER

BACKGROUND OF THE INVENTION

1. Field of the Invention

This invention relates to a fluidic accelerometer having a single sensitive axis, and, more particularly, to a fluidic accelerometer utilizing viscous damping.

2. Description of the Prior Art

In one form of a prior art fluidic accelerometer, a seismic mass floats on an air cushion within a hydrostatic air bearing. A damping force is applied to the seismic mass from either an active fluidic amplifier or wave shaping network or from a displacement flow through a laminar restriction. This type of accelerometer requires that the surface separation between the seismic mass and air bearing be accurately controlled, thereby rendering the structure both highly susceptible to contamination, and also extremely costly to fabricate.

In order to overcome the susceptibility of the above described accelerometer to contamination, another prior art type accelerometer provides that the seismic mass be suspended on flexure pivots, rather than on an air cushion. In this instance, both the restoring and damping forces applied to the seismic mass are generated by active fluidic amplifiers. Although this type of fluidic accelerometer is less susceptible to contamination than the first described accelerometer, the latter accelerometer is still susceptible to some contamination, and is also costly to fabricate.

OBJECTS OF THE INVENTION

It is therefore an object of this invention to provide for an improved fluidic accelerometer which is less susceptible to contamination than are prior art fluidic accelerometers.

It is another object of this invention to provide for an improved fluidic accelerometer which does not require that external forces be applied to dampen oscillatory movement of the seismic mass.

It is another object of this invention to provide a fluidic accelerometer which does not require the use of external fluidic amplifiers or networks to apply a restoring force to the seismic mass.

It is another object of this invention to provide an improved fluidic accelerometer having none of the disadvantages of the prior art devices, and which is easy and inexpensive to fabricate.

Other objects of the invention will be pointed out hereinafter.

SUMMARY OF THE INVENTION

According to a broad aspect of the invention there is provided a fluidic accelerometer having a single sensitive axis. The accelerometer is comprised of a seismic mass having first and second end surfaces positioned perpendicular to the sensitive axis, viscous damping means mechanically coupled to and suspending the seismic mass in a normal null position for damping oscillatory movement of the seismic mass in the direction of the sensitive axis, and means responsive to movement of the seismic mass in the direction of the sensitive axis for providing a restoring force to return the seismic mass to the normal null position and for producing an output fluidic signal variation proportional to the acceleration of the seismic mass in the direction of the sensitive axis. The accelerometer has first and second plenum chambers and first and second passageways for venting the respective first and second plenum chambers to atmosphere. The first end surface of the seismic mass is positioned within the first plenum chamber, and the second end surface of the seismic mass is positioned within the second plenum chamber.

The responsive means is comprised of first and second nozzles having respective first and second outlets positioned adjacent the first and second end surfaces of the seismic mass within the respective first and second plenum chambers, first and second flow restrictors, first and second means for fluidically coupling a fluid from a supply to the respective first and second nozzle outlets via the respective first and second flow restrictors for providing the necessary restoring force to return the seismic mass to the normal null position, and first and second outlet ports fluidically coupled to the first and second respective nozzle outlets for producing first and second output signals therebetween having a differential pressure variation proportional to the acceleration of the seismic mass in the direction of the sensitive axis.

The viscous damping means is comprised of first and second flexible diaphragms contiguous with the respective first and second respective plenum chambers for gripping the seismic mass and defining a cavity between the diaphragms, a rigid member intermediate of the first and second diaphragms for dividing the cavity into first and second compartments, and a liquid filling the first and second compartments. The rigid member has at least one centrally located annular hole therethrough for providing fluidic communication between the first and second compartments, whereby movement of the seismic mass in response to an acceleration in the direction of the sensitive axis causes a portion of the liquid to be transferred between the first and second compartments.

The accelerometer can also be comprised of means for applying a fluidic signal to the seismic mass within the second plenum chamber for counteracting the force of gravity on the fluidic accelerometer.

DESCRIPTION OF THE PREFERRED EMBODIMENT

Figure 1:
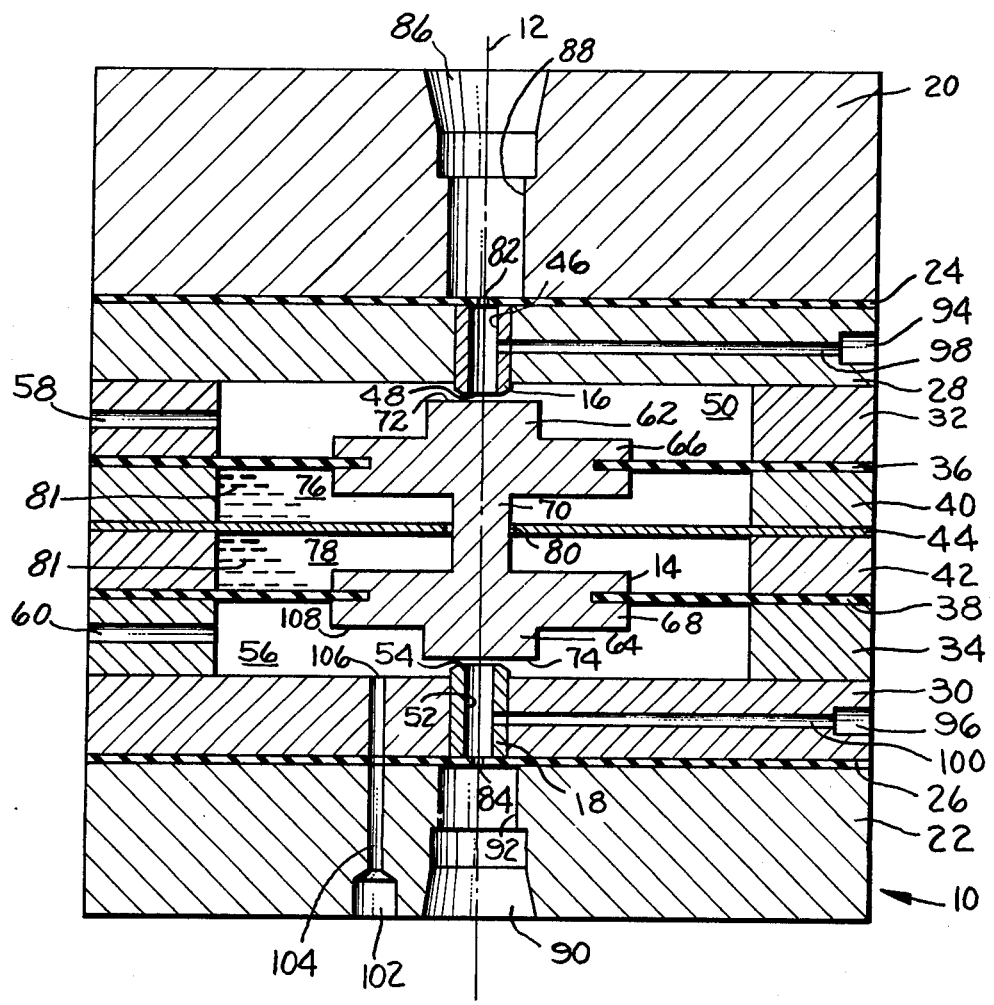
FIG. 1 is a sectional view of the fluidic accelerometer in accordance with the invention.

The invention will now be explained with reference to FIG. 1.

A fluidic accelerometer 10, having a single sensitive axis 12, is comprised of a seismic mass 14, first and second nozzles 16 and 18, first and second end sections 20 and 22, first and second flow restrictors 24 and 26, first and second intermediate sections 28 and 30, first and second annular spacer sections 32 and 34, first and second flexible elastomeric diaphragms 36 and 38, third and fourth annular spacer sections 40 and 42 and a rigid disc shaped member 44.

Nozzle 16 has a passageway 46 therein, which is axially aligned with sensitive axis 12, and an outlet 48 located within a plenum chamber 50. Similarly, nozzle 18 has a passageway 52 therein, which is also axially aligned with sensitive axis 12, and an outlet 54 positioned within a plenum chamber 56. Plenum chamber 50 is bounded by first intermediate section 28, first diaphragm 36 and first annular spacer section 32, and plenum chamber 56 is bounded by second intermediate section 30, second diaphragm 38 and second annular spacer section 34. First and second spacer sections 32 and 34 have respective passageways 58 and 60 therethrough for venting respective chambers 50 and 56 to the atmosphere.

Seismic mass 14 is comprised of first and second respective end sections 62 and 64, first and second respective flange sections 66 and 68 contiguous with respective end sections 62 and 64, and an intermediate section 70 extending between flange sections 66 and 68. Intermediate section 70 is of reduced cross sectional area with respect to the end and flange sections, and all of the sections of the seismic mass can be cylindrically shaped in the direction of sensitive axis 12. First diaphragm 36 is positioned between spacer sections 32 and 40, and secnd diaphragm 38 is positioned between spacer sections 42 and 34. Diaphragm 36 surrounds and grips a peripheral portion of flange section 66, while diaphragm 38 surrounds and grips a peripheral portion of flange section 68, whereby to suspend and hold the seismic mass in a normal null position. When the seismic mass is ir the normal null position, respective end surfaces 72 and 74 of respective end sections 62 and 64 of the seismic mass are positioned perpendicular to sensitive axis 12 and adjacent respective nozzle outlets 48 and 54 within respective plenum chambers 50 and 56. The areal dimension of end surfaces 72 and 74 are greater than and extend beyond the perimeter defined by the areal dimension of respective nozzle outlets 48 and 54. At the same time end surfaces 72 and 74 are spaced a distance away from respective nozzle outlets 48 and 54 so that the maximum displacement between an end surface and a nozzle outlet is never greater than 20% of the inner diameter of the nozzle outlet nor less than zero percent of the inner diameter of the nozzle outlet during operation of the accelerometer.

Means for providing viscous damping of the seismic mass in the direction of sensitive axis 12 is comprised of diaphragms 36 and 38 separated by a cavity, which cavity is divided into first and second respective compartments 76 and 78 by the positioning of rigid disc 44 between spacers 40 and 42. Rigid disc 44 has a hole for allowing intermediate section 70 of mass 14 to pass therethrough. However, an annular clearance 80 is still provided between section 70 and disc 44, thereby enabling first and second compartments 76 and 78 to be in fluidic communication with one another. Compartments 76 and 78 are filled with a suitable liquid 81, such as oil, wherein a portion of the liquid in one compartment is transferred to the other department through annular clearance 80 when the seismic mass is displaced in the direction of sensitive axis 12.

Flow restrictor 24 is positioned between end section 20 and intermediate section 28, and has a hole 82 therethrough which hole is axially aligned with sensitive axis 12 and in fluidic communication with nozzle passageway 46 for defining the fluidic resistance of the flow restrictor. Similarly, flow restrictor 26 is positioned between end section 22 and intermediate section 30, and has a hole 84 therethrough, which hole is axially aligned with sensitive axis 12 and in fluidic communication with nozzle passageway 52.

End section 20 has an input fluidic power signal port 86 and a passageway 88 for fluidically coupling a fluid power signal from a fluid power source (not shown) to nozzle outlet 48 via flow restrictor hole 82 and nozzle passageway 46. Similarly, end section 22 has a fluidic power port 90 and a passageway 92 therethrough for fluidically coupling a fluid power signal from a power source to nozzle outlet 54 via flow restrictor hole 84 and nozzle passageway 52. Intermediate sections 28 and 30 have respective output signal ports 94 and 96 therein fluidically coupled to respective nozzle passageways 46 and 52 via respective passageways 98 and 100 within the respective intermediate sections. Output signal ports 94 and 96 provide output fluidic signals from the accelerometer which are proportional to the back pressure at respective nozzle outlets 48 and 54. The back pressure at the nozzle outlets vary with respect to the position of the end surfaces of the end sections of the seismic mass thereto. When the seismic mass in the normal null position, the pressure differential of the output fluidic signals taken between output ports 94 and 96 is zero. End section 22 can also have a reference signal port 102 therein which is fluidically coupled via a passageway 104 to plenum chamber 56. An outlet 106 of passageway 104 is spaced from an end surface 108 of flange section 68 of mass 14 by a distance of at least five times the diameter of outlet 106 for reasons which will be explained later.

While the diaphragms 36 and 38 can be comprised of natural or synthetic rubber or other like flexible material, the remaining components of accelerometer 10 can be comprised of steel, aluminum, brass, rigid plastic or other suitable types of material.

The operation of the fluidic accelerometer will now be explained. When the accelerometer is either in a stationary position or is moving at a constant velocity in the direction of sensitive axis 12, first and second power signals are fluidically coupled from a suitable power source to respective nozzle outlets 48 and 54 to maintain seismic mass 14 in its neutral null position, whereby the differential pressure of the output signals taken between output ports 94 and 96 is zero. As the device begins to accelerate along its sensitive axis in the upward direction with reference to FIG. 1, seismic mass 14 begins to move closer to nozzle outlet 54 and further away from nozzle outlet 48. This causes an increase in the back pressure at nozzle outlet 54, which increase is sensed at output port 96, and a decrease in back pressure at nozzle outlet 48, which decrease is sensed at output port 94. Inasmuch as the acceleration of the device is approximately equal to a differential pressure change in the output signals between output ports 94 and 96 multiplied by a scale factor determined by the areal dimension of one of the nozzle outlets (assuming the diameter of both nozzle outlets to be equal) divided by the mass of seismic mass 14, the acceleration of the device is easily calculatable by monitoring the differential output pressure of the signals between output ports 94 and 96. At the same time, since the pressure at nozzle outlet 54 is increasing while the pressure at nozzle outlet 48 is decreasing, a restoring force is applied to the seismic mass, which force has a magnitude equal to the differential output pressure multiplied by the areal dimension of one of the nozzle outlets, so as to return the seismic mass to its normal null position. Similarly, when device 10 is accelerating upward, and seismic mass 14 is moving towards nozzle outlet 54, diaphragm 36, in turn, is forced to move in the direction towards nozzle outlet 54, thereby causing a transfer in oil from compartment 76 to compartment 78 via annular clearance 80. The force required to transport the oil at a given rate from compartment 76 to 78 comprises the viscous damping force applied to the accelerometer, which force eliminates the otherwise resulting oscillatory movement of the end surfaces of the seismic mass with respect to their nozzle outlets. Since the damping force is inversely proportional to the magnitude of annular clearance 80 and the rate of flow of the liquid within the compartments, by adjusting the dimension of the annular clearance and the selection of the viscosity of the liquid within the compartments, the desired viscous damping can be provided. Of course, if the force of acceleration on the device is in the downward direction along sensitive axis 12 with reference to FIG. 1, seismic mass 14 would move towards nozzle outlet 48, and the accelerometer would operate in an analogous manner to the manner previously described above.

If it is desired that a steady state acceleration force applied to device 10, such as gravity, be cancelled out, then a reference fluidic signal can be applied to reference port 102. The momentum of the jet exiting passageway outlet 106 is equal to the pressure of the reference fluid multiplied by the areal dimension of outlet 106. Since the force applied to end surface 108 of flange section 68 of the seismic mass is proportional to the jet momentum of the signal exiting outlet 106, by varying the pressure of the reference signal, any desired steady state acceleration force can be cancelled out. At this point it should be noted that the distance between end surface 108 of flange section 68 and reference passageway outlet 106 is greater than five times the diameter of outlet 106 to insure that the force of the jet exiting outlet 106 and applied to seismic mass 14 is effectively independent of the relative displacement between the mass and nozzle outlets 48 and 54.

Thus, not only does device 10 provide a convenient means for monitoring acceleration in the direction of a sensitive axis, but the device described above is less susceptible to contamination and to errors caused by vibrating components, and is less expensive to fabricate than comparative prior art devices.

Although the invention has been described with reference to a specific embodiment thereof, numerous modifications are possible without departing from the invention, and it is desirable to cover all modifications falling within the spirit and scope of this invention.

What I claim as new and desire to secure by Letters Patent of the United States is:

1. A fluidic accelerometer having a sensitive axis, comprising:
   a. a seismic mass having first and second end surfaces positioned perpendicular to said sensitive axis;
   b. viscous damping means, mechanically coupled to and suspending said seismic mass in a normal null position, for damping oscillatory movement of said seismic mass in the direction of said sensitive axis;
   c. means responsive to movement of said seismic mass in the direction of said sensitive axis for providing a restoring force to return said seismic mass to the normal null position and for producing an output fluidic signal variation proportional to the acceleration of said seismic mass in the direction of said sensitive axis; and
   d. means for applying a fluidic signal to said seismic mass perpendicular to one of said first and second end surfaces for counteracting the force of gravity on said fluidic accelerometer.

2. A fluidic accelerometer according to claim 1, wherein said accelerometer has first and second plenum chambers and first and second passageways for venting said respective first and second plenum chambers to atmosphere, said first end surface of said seismic mass being positioned within said first plenum chamber and said second end surface of said seismic mass being positioned within said second plenum chamber.

3. A fluidic accelerator according to claim 2, wherein said responsive means is comprised of:
   a. first and second nozzles having respective first and second outlets positioned adjacent said respective first and second end surfaces of said seismic mass within said respective first and second plenum chambers;
   b. first and second flow restrictors;
   c. first and second means for fluidically coupling a fluid from a supply to said respective first and second nozzle outlets via said respective first and second flow restrictors for providing the necessary restoring force to return said seismic mass to the normal null position; and
   d. first and second outlet ports fluidically coupled to said first and second respective nozzle outlets for producing first and second output signals therebetween having a differential pressure variation proportional to the acceleration of the seismic mass in the direction of said sensitive axis.

4. A fluidic accelerometer according to claim 2, wherein said viscous damping means is comprised of:
   a. first and second flexible diaphragms bounding said respective first and second respective plenum chambers for gripping said seismic mass and defining a cavity therebetween;
   b. a rigid member intermediate of said first and second diaphragms and dividing said cavity into first and second compartments, said rigid member having at least one centrally located annular hole therethrough for providing fluidic communication between said first and second compartments;
   c. said seismic mass having a central portion extending through said hole in said rigid member; and
   d. a liquid filling said first and second compartments, whereby movement of said seismic mass in response to an acceleration causes a portion of said liquid to be transferred between said first and second compartments.

5. A fluidic accelerometer according to claim 4, wherein said liquid is comprised of oil.

6. A fluidic accelerometer having a sensitive axis, first and second plenum chambers and first and second passageways for venting said respective first and second plenum chambers to atmosphere, comprising:
   a. a seismic mass having first and second end surfaces positioned within said respective first and second plenum chambers and perpendicular to said sensitive axis;
   b. viscous damping means, mechanically coupled to and suspending said seismic mass in a normal null position, for damping oscillatory movement of said seismic mass in the direction of said sensitive axis, said viscous damping means comprising:
      i. first and second flexible diaphragms bounding said respective first and second respective plenum chambers for gripping said seismic mass and defining a cavity therebetween;
      ii. a rigid member intermediate of said first and second diaphragms and dividing said cavity into first and second compartments, said rigid member having at least one centrally located annular hole therethrough for providing fluidic communication between said first and second compartments;

iii. said seismic mass having a central portion extending through said hole in said rigid member; and iiii. a liquid filling said first and second compartments, whereby movement of said seismic mass in response to an acceleration causes a portion of said liquid to be transferred between said first and second compartments; and c. means responsive to movement of said seismic mass in the direction of said sensitive axis for providing a restoring force to return said seismic mass to the normal null position and for producing an output fluidic signal variation proportional to the acceleration of said seismic mass in the direction of said sensitive axis.

7. A fluidic accelerometer according to claim 6, further comprising means for applying a fluidic signal to said seismic mass within said second plenum chamber for counteracting the force of gravity on said fluidic accelerometer.

8. A fluidic accelerometer according to claim 6, wherein said responsive means is comprised of:

a. first and second nozzles having respective first and second outlets positioned adjacent said respective first and second end surfaces of said seismic mass within said respective first and second plenum chambers;

b. first and second flow restrictors;

c. first and second means for fluidically coupling a fluid from a supply to said respective first and second nozzle outlets via said respective first and second flow restrictors for providing the necessary restoring force to return said seismic mass to the normal null position; and d. first and second outlet ports fluidically coupled to said first and second respective nozzle outlets for producing first and second output signals therebetween having a differential pressure variation proportional to the acceleration of said seismic mass in the direction of said sensitive axis.

9. A fluidic accelerometer according to claim 6, wherein said liquid is comprised of oil.

* * * * *

UNITED STATES PATENT OFFICE
CERTIFICATE OF CORRECTION

Patent No. 3,961,536　　　　　　　　　Dated June 8, 1976

Inventor(s) Carl Gustave Ringwall

It is certified that error appears in the above-identified patent and that said Letters Patent are hereby corrected as shown below:

Column 6, line 7, delete "accelerator" and insert therein -- accelerometer --

Signed and Sealed this

Thirty-first Day of August 1976

[SEAL]

Attest:

RUTH C. MASON
*Attesting Officer*

C. MARSHALL DANN
*Commissioner of Patents and Trademarks*